US006943968B2

(12) United States Patent
Nielson et al.

(10) Patent No.: US 6,943,968 B2
(45) Date of Patent: Sep. 13, 2005

(54) ADJUSTABLE FOCUSING COMPOSITE FOR USE IN AN OPTICAL PROFILOMETER SYSTEM AND METHOD

(75) Inventors: Gregory N. Nielson, Cambridge, MA (US); George Barbastathis, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 10/423,670

(22) Filed: Apr. 25, 2003

(65) Prior Publication Data

US 2004/0021053 A1 Feb. 5, 2004

Related U.S. Application Data

(60) Provisional application No. 60/375,792, filed on Apr. 26, 2002.

(51) Int. Cl.[7] .......................... G02B 7/02; G01B 11/30; G01B 11/24
(52) U.S. Cl. ...................... 359/822; 356/600; 356/609; 702/167
(58) Field of Search ................................. 359/822–824; 356/2, 511, 600, 609, 624; 464/79; 702/166, 167; 73/105

(56) References Cited

U.S. PATENT DOCUMENTS

| 4,110,617 | A | | 8/1978 | Legille ........................ 250/342 |
|---|---|---|---|---|
| 4,268,968 | A | | 5/1981 | Przybylinski et al. ......... 33/548 |
| 4,288,926 | A | | 9/1981 | Long et al. ................... 33/554 |
| 4,290,067 | A | | 9/1981 | Legille et al. ............... 342/124 |
| 4,332,374 | A | | 6/1982 | Kremer ........................ 266/99 |
| 4,571,695 | A | | 2/1986 | Elton et al. ................. 702/167 |
| 4,576,479 | A | * | 3/1986 | Downs ........................ 356/495 |
| 4,579,545 | A | | 4/1986 | Chapman ...................... 464/79 |
| 4,851,773 | A | | 7/1989 | Rothstein .................... 324/220 |
| 4,916,319 | A | | 4/1990 | Telfair et al. ............. 250/461.1 |
| 5,020,904 | A | | 6/1991 | McMahan, Jr. ............. 356/35.5 |
| 5,054,926 | A | | 10/1991 | Dabbs et al. ................ 356/624 |
| 5,105,552 | A | | 4/1992 | Bielle .......................... 33/573 |
| 5,166,751 | A | | 11/1992 | Massig ........................ 356/495 |
| 5,264,678 | A | | 11/1993 | Powell et al. .......... 219/130.01 |
| 5,309,755 | A | | 5/1994 | Wheeler ....................... 73/105 |

(Continued)

FOREIGN PATENT DOCUMENTS

| DE | 41 23 052 | 3/1992 |
|---|---|---|
| EP | 0 198 557 | 4/1986 |
| EP | 0 560 664 | 3/1993 |

OTHER PUBLICATIONS

"Lithographic patterning and confocal imaging with zone plates," Gil et al. *Journal of Vacuum Science Technology*. Nov/Dec 2000.

(Continued)

*Primary Examiner*—Georgia Epps
*Assistant Examiner*—William Choi
(74) *Attorney, Agent, or Firm*—Gauthier & Connors LLP

(57) ABSTRACT

An adjustable lens is disclosed for use in an optical profilometer system. The adjustable lens includes a plurality of elements that are mutually spaced from another in a first position and provides a first focal point for an incident electromagnetic field having a first frequency incident at a first angle with respect to the plurality of elements. The adjustable lens also includes an actuation unit for changing the focal point of the plurality of elements to provide a second focal point for the incident electromagnetic field having the first frequency incident at the first angle with respect to the plurality of elements.

25 Claims, 7 Drawing Sheets

U.S. PATENT DOCUMENTS

| | | | |
|---|---|---|---|
| 5,349,440 A | 9/1994 | DeGroot | 356/489 |
| 5,469,250 A | 11/1995 | Holmes | 356/28 |
| 5,539,516 A | 7/1996 | Heinrich et al. | 356/450 |
| 5,565,987 A | 10/1996 | Jain et al. | 356/501 |
| 5,705,741 A | 1/1998 | Eaton et al. | 73/105 |
| 5,829,149 A | 11/1998 | Tyson | 33/523 |
| 5,861,549 A | 1/1999 | Neukermans et al. | 310/333 |
| 5,880,846 A | 3/1999 | Hasman et al. | 356/602 |
| 5,955,661 A | 9/1999 | Samsavar et al. | 73/105 |
| 6,229,617 B1 | 5/2001 | Piltch et al. | 356/511 |
| 6,272,907 B1 | 8/2001 | Neukermans et al. | 73/105 |
| 6,392,749 B1 | 5/2002 | Meeks et al. | 356/634 |
| 6,469,794 B1 | 10/2002 | Piltch et al. | 356/511 |

OTHER PUBLICATIONS

"Confocal microscopy with a refractive microlens–pinhole array," Eisner et al. *Optics Letters*. May 1998, vol. 23, No. 10.

"Proposal of human eye's crystalline lens–like variable focusing lens," Ahn et al. *Broadband Optical Networks and Technologes: An Emerging Reality*. Jul. 1998.

"Sharper images by focusing soft X–rays with photon sieves," Kipp et al. *Nature*. Nov. 2001. vol. 414.

"An elastic thin–film microlens array with pneumatic actuator," Hoshino et al. *Micromechanical Systems*. Jan. 2001.

\* cited by examiner

ADJUSTABLE FOCUSING COMPOSITE FOR USE IN AN OPTICAL PROFILOMETER SYSTEM AND METHOD

PRIORITY

This application claims priority to U.S. Provisional Application Ser. No. 60/375,792 filed Apr. 26, 2002.

BACKGROUND OF THE INVENTION

The invention relates to profilometers, and relates in particular to optical profilometers. Profilometers may be used for a variety of applications involving the determination of the depth or contours of a surface. Obtaining information regarding a profile of a surface is important in many areas of manufacturing and research. For example, U.S. Pat. No. 5,565,987 discloses a profilometer system that includes a stylus for closely tracking a surface on a sub-nanometer scale, and U.S. Pat. No. 5,705,741 discloses a profilometer system that includes a constant force mechanism for biasing a stylus arm.

Optical profilometers provide sensitive non-contact profilometry. Certain conventional optical profilometer systems, however, such as those disclosed in *Confocal Microscopy with a Refractive Microles-Pinhole Array*, by M. Eisner, N. Lindlein, and J. Schwider, OPTICS LETTERS, v. 23, no. 10 (May 1998); and *Lithographic Patterning and Confocal Imaging with Zone Plates*, D. Gil, R. Menon, D. Carter, and H. Smith, J. VACUUM SCIENCE AND TECHNOLOGY B, 18(6) p. 2881–2885 (November/December 2000) require that a lens array be physically moved to change the focal area during scanning. Such mechanical movement may be time consuming and difficult to achieve in an assembly that is efficient and economical to produce. A variety of optical profilometers have been developed that may avoid moving a lens. For example, U.S. Pat. No. 4,579,454 discloses an optical profilometer in which the position of a focal point within a detector area is determined. U.S. Pat. No. 6,229,617 discloses an optical profilometer system in which light reflected from a surface is interfered with reference laser energy to produce an interference pattern.

There remains a need however, for an optical profilometer that more efficiently and economically determines the spatial profile an area within its field of view.

SUMMARY OF THE INVENTION

The invention provides an adjustable focusing composite for use in an optical profilometer system. The adjustable focusing composite includes a plurality of elements that are mutually spaced from another in a first position and provides a first focal area for an incident electromagnetic field having a first frequency incident at a first angle with respect to the plurality of elements. The adjustable focusing composite also includes an actuation unit for changing the focal area of the plurality of elements to provide a second,focal area for the incident electromagnetic field having the first frequency incident at the first angle with respect to the plurality of elements.

BRIEF DESCRIPTION OF THE DRAWING

The following description may be further understood with reference to the accompanying drawings in which.

The drawings are shown for illustrative purposes and are not to scale.

DETAILED DESCRIPTION OF THE INVENTION

Figure 1:
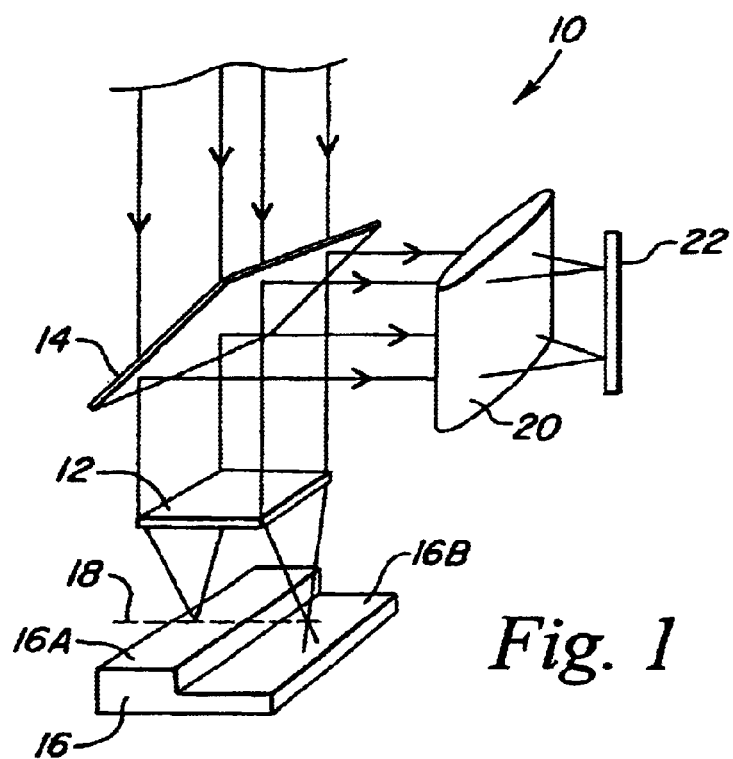
FIGS. 1 and 2 show illustrative diagrammatic views of optical profilometer systems in accordance with various embodiments of the invention.
Figure 2:
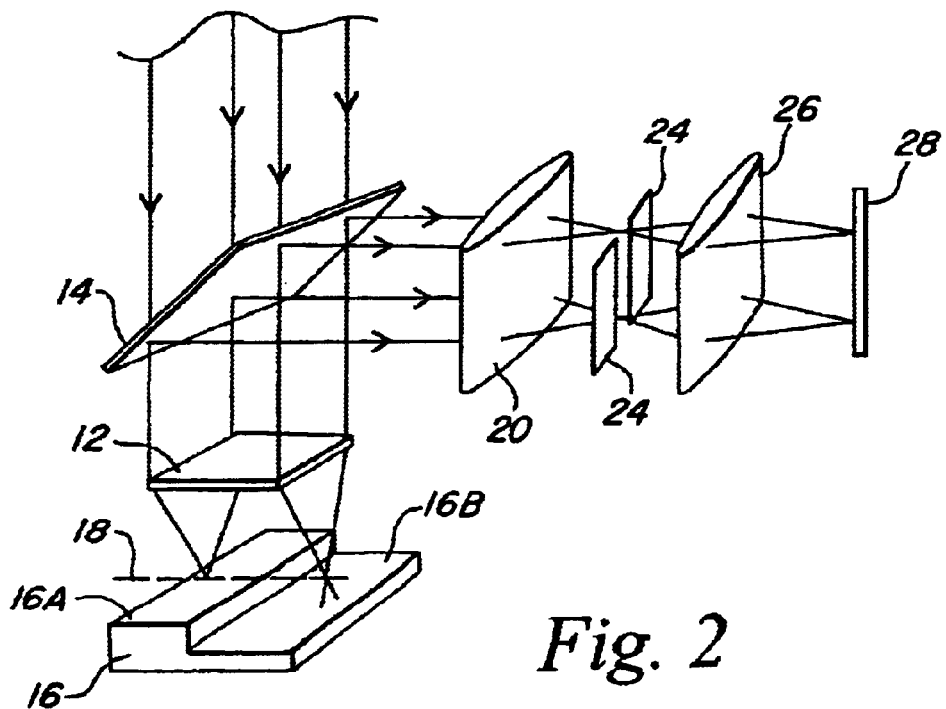

Optical profilometer systems in accordance with various embodiments of the invention may employ an adjustable cylindrical focusing composite as shown in FIGS. 1 and 2. An advantage of a cylindrical lens is that it allows a line of information to be collected as shown rather than just a single point. In further embodiments, systems of the invention may employ adjustable focusing composites that provide a focal area that is centralized at a point, a focal area that includes a line as shown in FIGS. 1 and 2, or a focal area that includes any desired one, two or three dimensional shape. The use of a focal line eliminates the need to scan in the direction of the focal line in certain circumstances. Also, the inherent tenability of the lens permits the lens to do its own depth scanning rather than relying on expensive external precision machinery.

As shown in FIG. 1 an embodiment of an optical profilometery system 10 in accordance with an embodiment of the invention includes an adjustable focusing composite 12 that is positioned between a beam splitter 14 and a subject to be scanned 16. The subject 16 includes a first surface portion 16A and a second surface portion 16B.

During use, a plane wave of a single wavelength of light passes through the beam splitter 14 and the adjustable focusing composite 12. The composite 12 focuses the light at a focal area 18 (e.g., a focal line). If the surface (16A) has any features that are at the same depth of the focal line, then the light striking those features will be reflected back through the composite 12 to become a plane wave that is directed from the beam splitter toward the detection optics. Light that is reflected by surface features (16B) that are not at the depth of the focal line will not become a plane wave upon passing back through the composite 12.

The light returning from the composite 12 is directed to a cylindrical lens 20 (of fixed focal length) by the beam splitter 14. Light that is a plane wave (from a surface reflection 16A at the focal depth of the composite 12) will be focused to a focal line at a sensor array 22. As shown in FIG. 2, a system in accordance with another embodiment of the invention may include a slit unit 24 providing a slit opening, which is positioned at the focal line of the lens 20, another lens 26 and a sensor array 28. Light that is not a plane wave will not be focused onto the sensor array 22 of FIG. 1 or the sensor array 28 of FIG. 2.

By looking at the intensity of the light impinging on the sensor array, one may determine whether there are any points of the surface that intersect the current focal line of the adjustable focusing composite, thereby locating the depth of those points. The optical profilometer then sweeps the focal length of the composite through a range of values to obtain information on the depth of the sample surface at all points on the plane defined by the focal line and the depth direction.

Once the depth data for a particular orientation of a sample surface and focusing composite is completely collected, the sample may then be moved to a new location and the depth scan may be again performed. By carefully stepping the sample beneath the adjustable focusing composite, a complete surface map of the entire sample may be created by stitching together the depth data from each step. This technique may be employed, for example, at each etch step in a micro-fabrication process.

Figure 3:
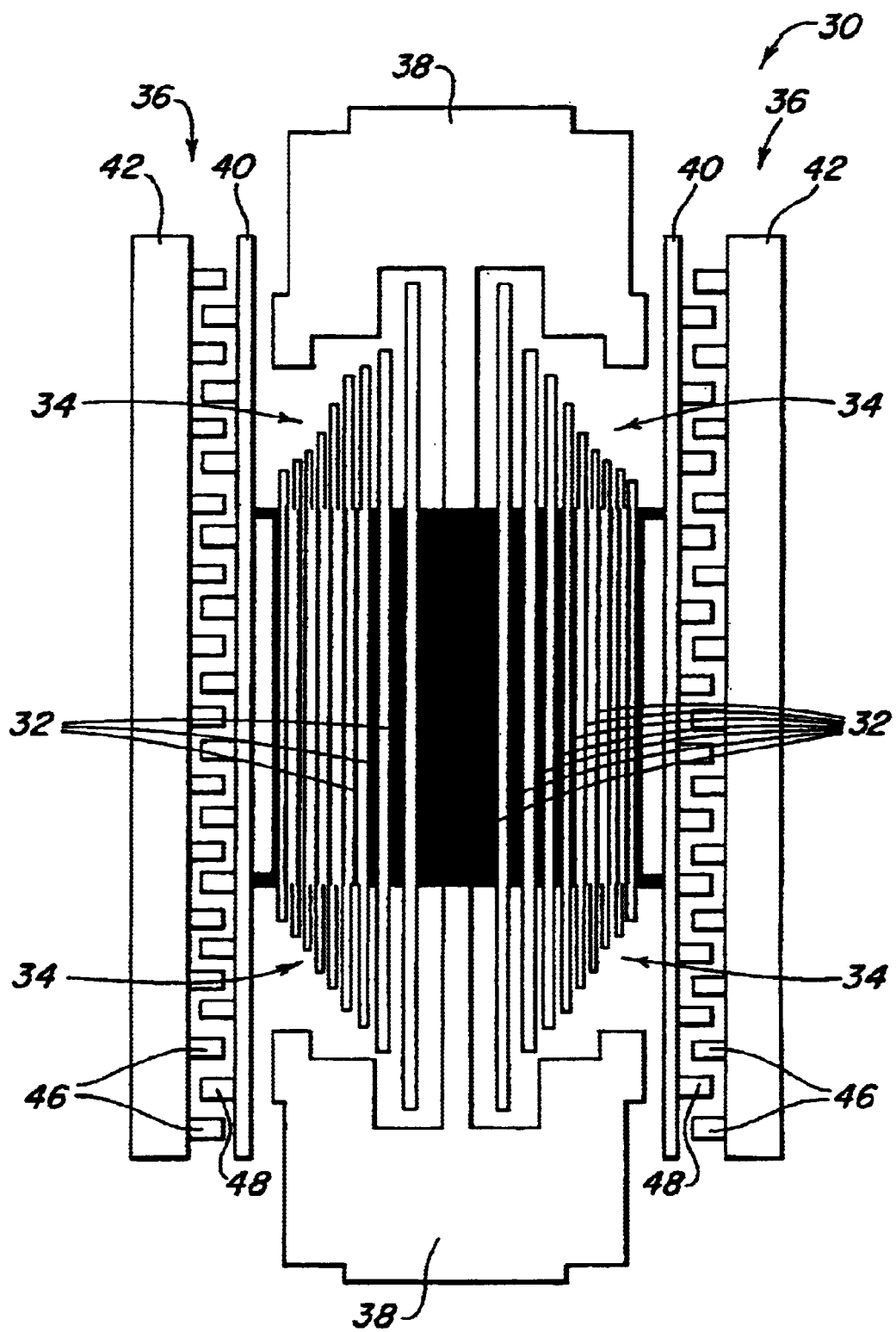
FIG. 3 shows an illustrative diagrammatic top view of an adjustable focusing composite of the invention.

As shown in FIG. 3, an adjustable focusing composite in accordance with an embodiment of the invention may be a tunable cylindrical zone plate 30 that includes diffractive elements 32, flexure springs 34, and a pair of comb drive mechanisms 36. The center element of the diffractive elements 32 may be fixed to an anchor structure 38, while each of the remaining diffractive elements is coupled to its adjacent diffractive elements via the flexure springs 34. The comb drive mechanisms 36 each include a comb element 40 that moves responsive to and with respect to a drive element 42. This movement of the comb element 40 with respect to the drive element 42 (and the anchor structure 38) causes an attachment bar 44 to pull on the outermost diffractive elements. Because the diffractive elements are coupled to one another via flexure springs, each diffractive element is then pulled away from its adjacent diffractive element by a small amount. When the drive elements 42 release the comb elements 40, the diffractive elements 32 are drawn toward each other via the flexure springs 34. An optical aperture for the adjustable focusing composite may include a large portion of the area defined by the diffractive elements, and may for example be between about 100 $\mu$m and 500 $\mu$m.

Figure 4A:
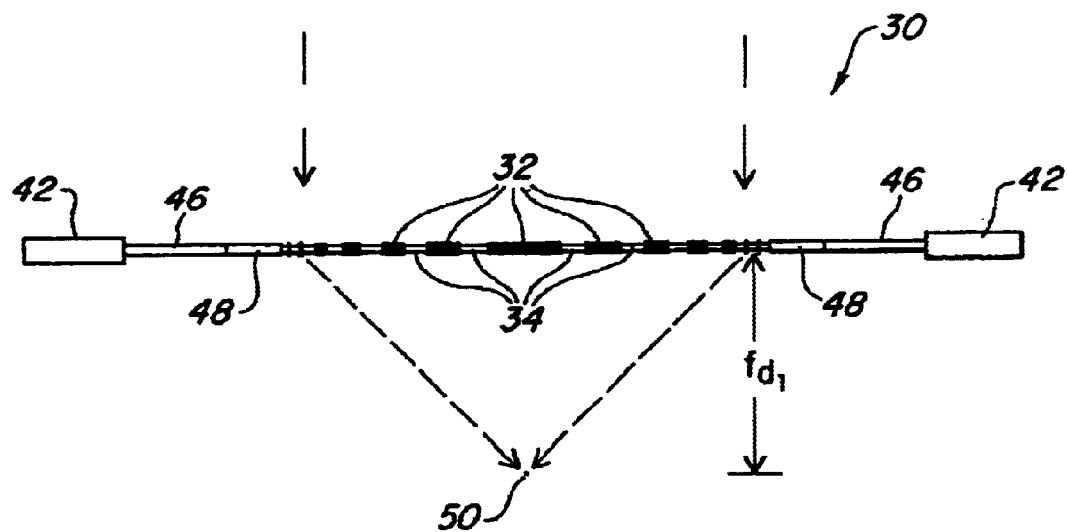
FIG. 4A shows an illustrative diagrammatic side view of an adjustable focusing composite similar to that shown in FIG. 3 taken along line 4A—4A thereof providing a first focal point in accordance with an embodiment of the invention.
Figure 4B:
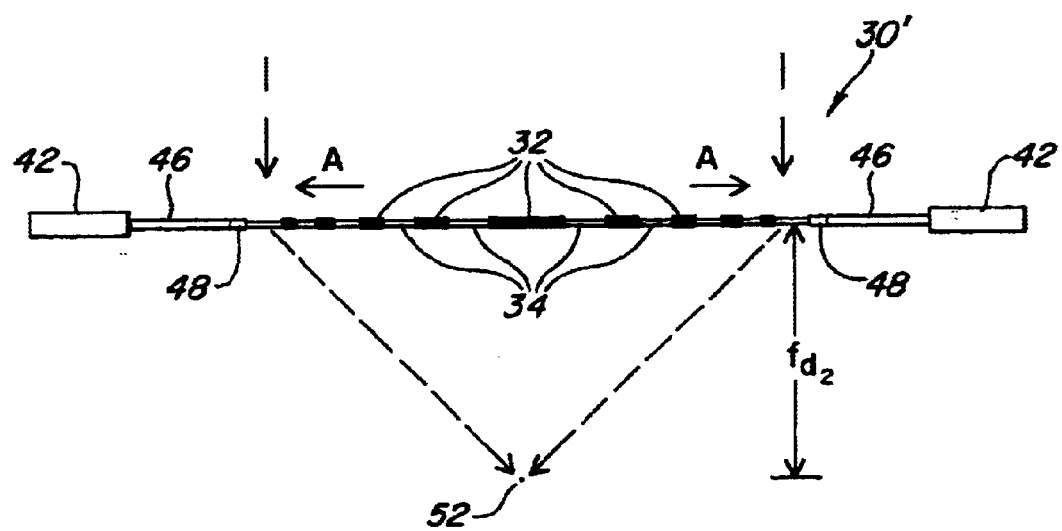
FIG. 4B shows an illustrative diagrammatic side view of an adjustable focusing composite of FIG. 4A providing a second focal point in accordance with an embodiment of the invention.

As shown in FIGS. 4A and 4B, the focal line may be adjusted from a first position having a focal distance $f_{d1}$ (as shown at 50 in FIG. 4A) to a second position having a focal distance $f_{d2}$ (as shown at 52 in FIG. 4B) by actuating the comb drive mechanisms 36 to draw the diffractive elements 32 away from one another as shown at A in FIG. 4B.

The time to record the surface profile of a sample may depend on the scanning time. Optical profilometer systems that record a line of data for each sample step should be faster than profilometer systems that retrieve information at only a point at a time. Also, because the tunable cylindrical zone plates are microfabricated, they lend themselves to being grouped together in a dense array. An array of the tunable cylindrical zone plates within the proposed optical profilometer would significantly reduce the scan times required to record the profile of a sample.

The resolution of the optical profilometer in both the depth direction and the lateral direction depends on the numerical aperture of the tunable cylindrical zone plate as well as the wavelength of the light used to interrogate the surface. It is anticipated that sub-micron resolution should be achievable. The range between the highest to lowest points in depth may be on the order of hundreds of micrometers, while the lateral ranges may be arbitrarily large depending on the range of the stepping machinery of the optical profilometer.

To further reduce scanning time and improve resolution, a closed loop feedback control system may be used with an optical profilometer in accordance with an embodiment. This feedback will be used to obtain, with high accuracy, the precise depth of maximum sensor intensity of points on a surface. Also, information from the sensor array may be used to tune the focal length for a step at the expected value of scanning range in the depth direction, and also will improve resolution by fine tuning the scanning at the surface depth. Similar feedback control systems may be implemented in AFM and fixed-current STM systems.

In further embodiments, the adjustable focusing composite may include a piezoelectric drive mechanism. The diffractive elements may be reflective, opaque or transparent in various embodiments, providing focusing via various combinations of amplitude or phase modulation. Optical profilometer systems of the invention provide increased scanning speed and lower manufacturing costs due, at least in part, to the elimination of expensive precision components that are used in conventional profilometry systems.

Figure 5A:
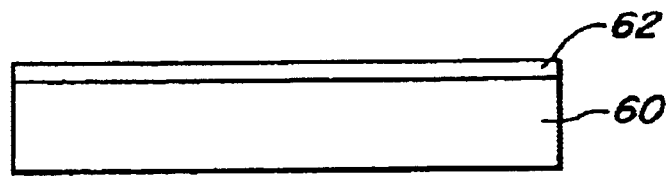
FIGS. 5A–5C show illustrative diagrammatic views of a portion of the adjustable focusing composite of FIGS. 4A and 4B during formation.
Figure 5B:
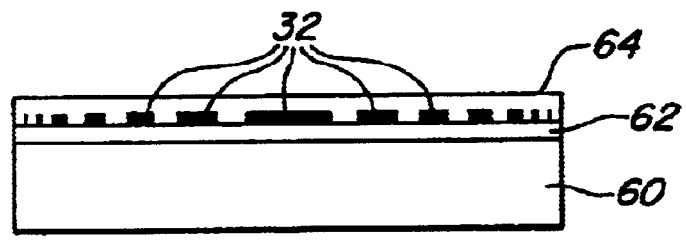

A structure of the invention may be formed by depositing a grating material in a pattern on a sacrificial substrate. A further sacrificial layer is then deposited onto the pattern. The sacrificial layers are then removed leaving an array of diffractive elements. In particular, as shown in FIG. 5A a sacrificial layer 62, comprising for example a 0.2 micron silicon dioxide ($SiO_2$) layer, is deposited or grown onto a base structure 60, which may be a diffusion barrier for a piezoelectric material, $Pb(Zr, Ti)O_3$. A grating material 32, such as a platinum bottom electrode, is then formed on the layer 62, for example by patterned evaporation through a mask using an HF/HCL reagent, and a second sacrificial layer 64 is then deposited on the grating material 32, filling the cavities between the grating elements 32 as shown in FIG. 5B.

Figure 5C:
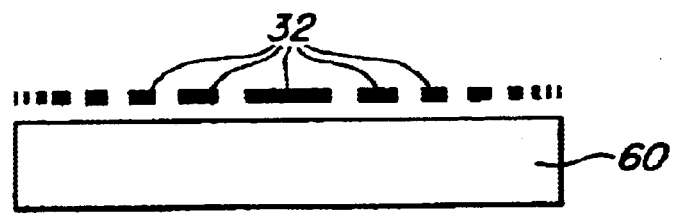

The structure may then be exposed to a chemical wash, using for example potassium hydroxide, that dissolves and removes the sacrificial layers 62 and 64 leaving an array formed of a plurality of diffractive elements 32 as shown in FIG. 5C. The ends of each of the grating elements are joined to one another in various ways in different embodiments as discussed below.

Figure 6:
FIGS. 6 and 7 show illustrative diagrammatic top and side views of an adjustable focusing composite in accordance with another embodiment of the invention.
Figure 7:
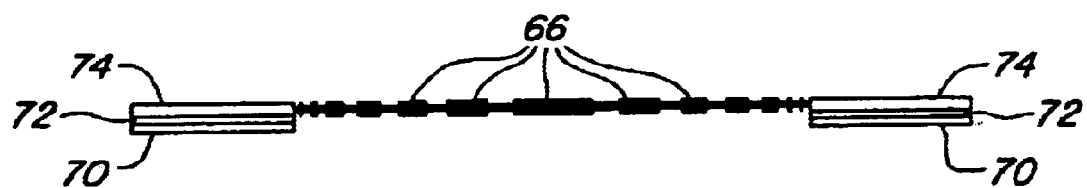

With reference to FIGS. 6 and 7, in the piezoelectric version, the diffractive elements 66 are coupled together at each end, providing rectangular openings between which are defined the diffractive elements 66. During fabrication, a 0.2 micron oxide is first grown as a diffusion barrier for the piezoelectric material. Platinum bottom electrodes 70 are then deposited via evaporation and patterned. Piezoelectric material 72 $Pb(Zr, Ti)O_3$, is then deposited and patterned with a HF/HCL reagent. The top electrodes 74 and the gratings 66 are then deposited and patterned similarly like the bottom electrode. The final step involves of a potassium hydroxide etch from the backside of the wafer to release the membrane structure.

During use, the electrodes 70 are anchored. When a voltage is applied across the electrodes 70 and 74, the electrodes 74 are caused to move relative to the electrodes 70 as shown at B in FIG. 6 due to the presence of the piezoelectric material 72. In this way, the relative spacing between the diffractive elements 66 may be adjusted to provide different focal areas. The stretching is achieved through flexure of the sides of the layer 66.

In the electrostatic version, the ends of the diffractive elements are coupled to one another via flexure springs, which are also formed during the deposition processes discussed above with reference to FIGS. 5A–5C. The diffractive elements at either end of the structure are each further coupled to a comb drive mechanism that includes, for example, drive extensions 46, and conductive fingers 48 that are received within between the extensions 46 as shown in FIG. 3. The drive extensions 46 are coupled to drive units 42, and the conductive fingers 48 are coupled to the outside edge of the diffractive elements as shown in FIG. 3. The drive mechanism and optional anchors are also formed by the above discussed deposition processes.

In further embodiments, a structure of the invention may be formed using a silicon-on-insulator wafer that has a 10 micron thick device layer and a 0.5 micro thick buried oxide. The device layer may be first etched using deep reactive ion etching technology, which allows the development of diffractive elements and flexure springs that are 10 microns thick. This increases the vertical stiffness of the structure and inhibits potential stiction problems during the release step. In further embodiments, lateral bumps may be employed to further reduce lateral stiction. The resulting structure is essentially residual-stress free because there is no film deposition. Moreover, because the buried oxide behaves essentially like a good etch stop, the design further avoids etching non-uniformities due to different exposure areas. The deep reactive etching technology process is followed by a hydrofluoric acid etching step to release the moving parts. Since the lateral dimension of the movable parts is much smaller than that of the fixed parts, large process latitude exists during the time-controlled release process. After releasing, an aluminum film is deposited to form electrodes and may also be used to form the surface on the gratings in certain embodiments.

The flexure stiffness of the flexure springs, the comb-drive pairs, and the grating period are each important design parameters. The stiffness of the flexure may be estimated by $k=Ew^3t/L^3$, where the effective spring constant for a grating period is on the left side, E is the Young's modulus of the material, t is the thickness of the structure, w is the width of the flexure beam, and L is the length of the folded beam. The flexure stiffness is selected based on a trade-off: low tuning voltage (<100 V) requires the device to be compliant. Additionally, the device should be stiff enough that the resonant frequency remains high (10 kHz or higher).

The driving force is rendered by the two comb-drives on the sides. Comb-drives draw very little current and therefore minimize power consumption, though the force delivered is relatively small (micro-Newtons or less). The force may be estimated as $F=N\epsilon tV^2/2g$ where N is the number of fingers, $\epsilon$ is the permittivity, t is the thickness, V is the applied voltage, and g is the gap. The minimum grating period is set by the resolution of the available lithography tool. Since the flexures on the sides of the grating must be defined, the minimum grating pitch may be 4 times the design rule for 75% duty cycle or 6 times for the design rule for 50% duty cycle. In the piezoelectric version, the driving force is via the deposited thin-film piezoelectric actuators. The diffractive grating may be etched above the membrane such that its period could be tuned progressively to a desired value in response to stretching of the membrane. Such devices may be designed such that the deformation may be on the order of 1–2 nm per period at an applied voltage of 0.05 volts. Further designs of the device may include free cantilever devices or perforated membrane devices.

The diffractive elements may be reflective or opaque to provide amplitude modulation of the received illumination. In other embodiments, the diffractive elements may be clear to provide phase modulation of the received illumination. In various embodiments, the composite itself may be transmissive or reflective. The diffractive elements may also be a variety of shapes other than those discussed above, and may include, for example, concentric circular Fresnel zone plates that are stretched radially to change the spacing of circular diffractive elements, or photon sieves, which include randomly placed holes (or spots) that decrease in radius the further the holes (or spots) are from a central point. Similarly, these photon sieves may be formed of a stretchable material that may be stretched to change the spacing between the diffractive elements (holes or spots). In these cases, the spacing between the diffractive elements may be changed by moving or stretching the material in outward and inward radial directions to provide a range of centralized focal areas. Photon sieves may also be used to provide a variety of other shapes of focal areas, including focal lines.

Figure 8:
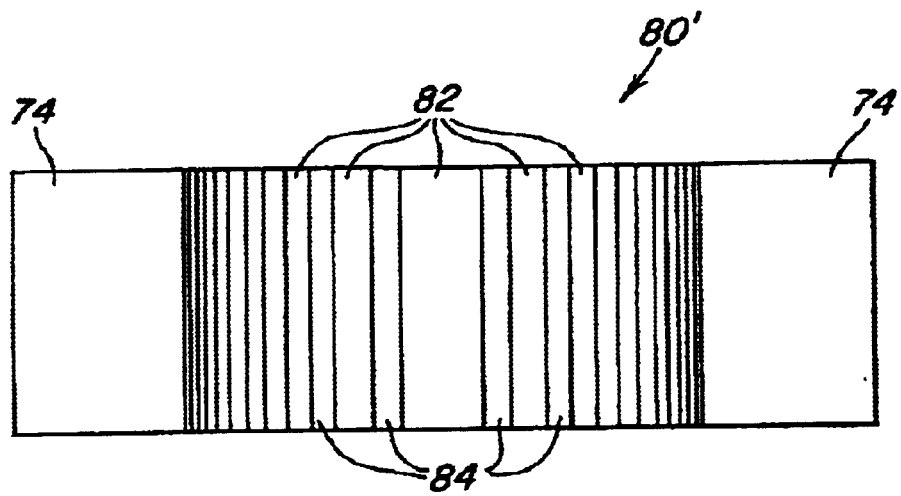
FIGS. 8 and 9 show illustrative diagrammatic top and side views of an adjustable focusing composite in accordance with a further embodiment of the invention.
Figure 9:
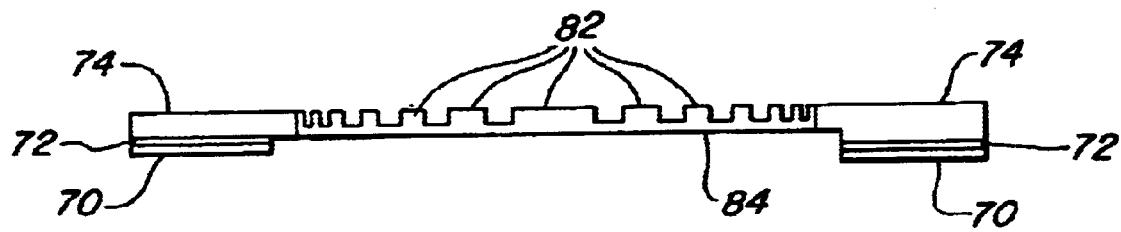
Figure 10:
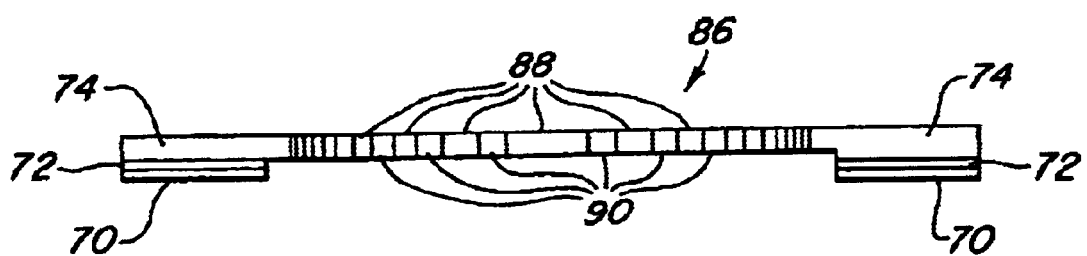
FIG. 10 shows an illustrative diagrammatic side view of an adjustable focusing composite in accordance with a further embodiment of the invention.

As shown in FIGS. 8 and 9, a focusing composite 80 in accordance with a further embodiment of the invention includes a plurality of diffractive elements 82 that are defined by variations in thickness in a base substrate 84. The diffractive elements 82 and substrate 84 may both be transparent. As shown in FIG. 10, focusing composite 86 in accordance with a further embodiment of the invention may include a plurality of diffractive elements 88 that are defined by variations in material with respect to a substrate 90.

Figure 11:
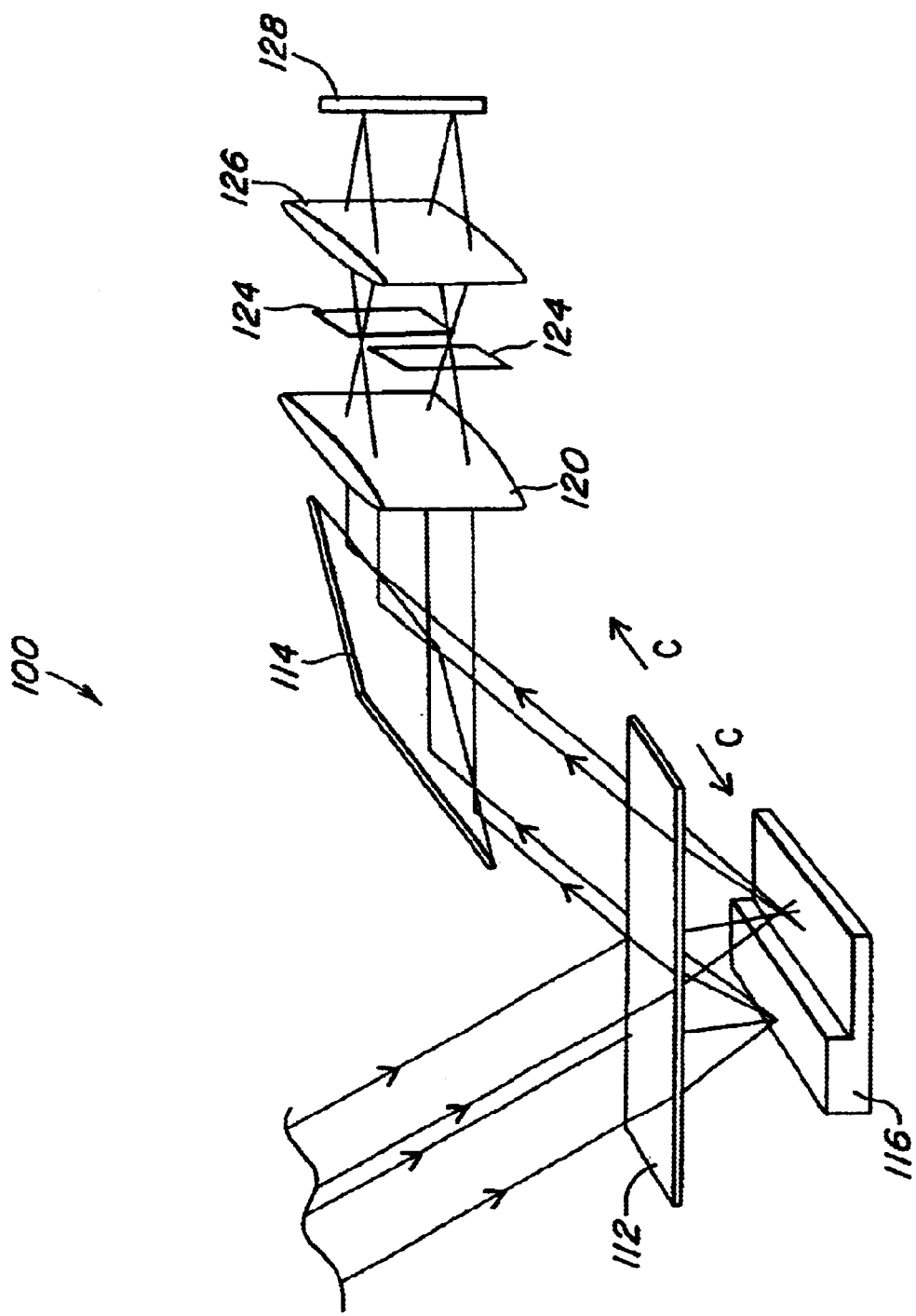
FIG. 11 shows an illustrative diagrammatic view of optical profilometer system in accordance with a further embodiment of the invention.

As shown in FIG. 11, a profilometer system 100 in accordance with a further embodiment of the invention may involve the incident electromagnetic field contacting an adjustable focusing composite 112 in a direction other than normal to the surface of the composite 112, and then reflecting via a mirror 114 toward a cylindrical lens 120, slit unit 124, and another cylindrical lens 126 that directs the field to sensor array 128. The operation of the system 100 is similar to that discussed above with reference to FIG. 2 with the focusing composite 112 being adjustable in a direction as generally indicated at C. In the system 100, however, the field that is reflected from the surface is not directed along the same path from which it approached the surface, permitting the system to not require a beam splitter.

Those skilled in the art will appreciate that numerous modifications and variations may be made to the above disclosed embodiments without departing from the spirit and scope of the invention.

What is claimed is:

1. An adjustable focusing composite for use in an optical profilometer system, said adjustable focusing composite comprising:

a plurality of elements that are mutually spaced from one another along a first direction in a first position and providing a first focal area in a second direction from said plurality of elements that is different than said first direction and non-parallel with said first direction, for an incident electromagnetic field having a first frequency incident at a first angle with respect to said plurality of elements; and actuation means for changing the focal area of said plurality of elements to provide a second focal area for said incident electromagnetic field having the first frequency incident at the first angle with respect to said plurality of elements.

2. The adjustable focusing composite as claimed in claim 1, wherein said elements are opaque elements.

3. The adjustable focusing composite as claimed in claim 1, wherein said elements are Fresnel lens elements.

4. The adjustable focusing composite as claimed in claim 1, wherein said elements are spaced along a lens surface having opposing first and second edges.

5. The adjustable focusing composite as claimed in claim 4, wherein said actuation means moves the first edge with respect to the second edge.

6. The adjustable focusing composite as claimed in claim 5, wherein said actuation means includes a comb drive mechanism.

7. The adjustable focusing composite as claimed in claim 5, wherein said actuation means includes a piezoelectric actuator.

8. The adjustable focusing composite as claimed in claim 1, wherein said elements provide a zone plate focusing lens.

9. The adjustable focusing composite as claimed in claim 8, wherein said elements provide amplitude modulation.

10. The adjustable focusing composite as claimed in claim 8, wherein said elements provide phase modulation.

11. An adjustable focusing composite for use in an optical profilometer system, said adjustable focusing composite comprising:

a plurality of Fresnel lens elements that are mutually spaced from one another between a first edge portion of said composite and a second edge portion of said composite in a first position and providing a first focal area for an incident electromagnetic field having a first frequency incident at a first angle with respect to said plurality of elements; and actuation means for changing the focal area of said plurality of Fresnel lens elements to provide a second focal area for said incident electromagnetic field having the first frequency incident at the first angle with respect to said plurality of elements by changing the position of said first edge portion with respect to said second edge portion of said composite.

12. The adjustable focusing composite as claimed in claim 11, wherein said Fresnel lens elements are opaque elements.

13. The adjustable focusing composite as claimed in claim 11, wherein said Fresnel lens elements are reflective elements.

14. The adjustable focusing composite as claimed in claim 11, wherein said actuation means includes a comb drive mechanism.

15. The adjustable focusing composite as claimed in claim 11, wherein said actuation means includes a piezoelectric actuator.

16. The adjustable focusing composite as claimed in claim 11, wherein said Fresnel lens elements provide amplitude modulation.

17. The adjustable focusing composite as claimed in claim 11, wherein said Fresnel lens elements provide phase modulation.

18. An adjustable focusing composite for use in an optical profilometer system, said adjustable focusing composite comprising:

a plurality of elements that are mutually spaced from one another along a first direction between a first edge of said composite and an opposing second edge of said composite in a first position and providing in a second direction from said plurality of elements that is different than said first direction and non-parallel with said first direction, a first focal line for an incident electromagnetic field having a first frequency incident at a first angle with respect to said plurality of elements, said first focal line extending in a third direction that is generally transverse to said second direction; and actuation means for changing the focal line of said plurality of elements to provide a second focal line for said incident electromagnetic field having the first frequency incident at the first angle with respect to said plurality of elements by changing the position of said first edge with respect to said second edge of said composite.

19. The adjustable focusing composite as claimed in claim 18, wherein said first angle is not normal to a surface of said adjustable focusing composite.

20. The adjustable focusing composite as claimed in claim 18, wherein said elements are formed from a substrate by removing portions of said substrate.

21. The adjustable focusing composite as claimed in claim 18, wherein said elements are formed of a first material within a substrate formed of a different second material.

22. An adjustable focusing composite for use in an optical profilometer system, said adjustable focusing composite comprising:

a plurality of zone plate elements that are mutually spaced from another in a first position and providing a first focal area for an incident electromagnetic field having a first frequency incident at a first angle with respect to said plurality of zone plate elements; and actuation means for changing the focal area of said plurality of zone plate elements to provide a second focal area for said incident electromagnetic field having the first frequency incident at the first angle with respect to said plurality of zone plate elements.

23. The adjustable focusing composite as claimed in claim 22, wherein said zone plate elements provide amplitude modulation.

24. The adjustable focusing composite as claimed in claim 22, wherein said zone plate elements provide phase modulation.

25. The adjustable focusing composite as claimed in claim 22, wherein said actuation means changes a distance between said plurality of zone plate elements.

* * * * *